UNITED STATES PATENT OFFICE.

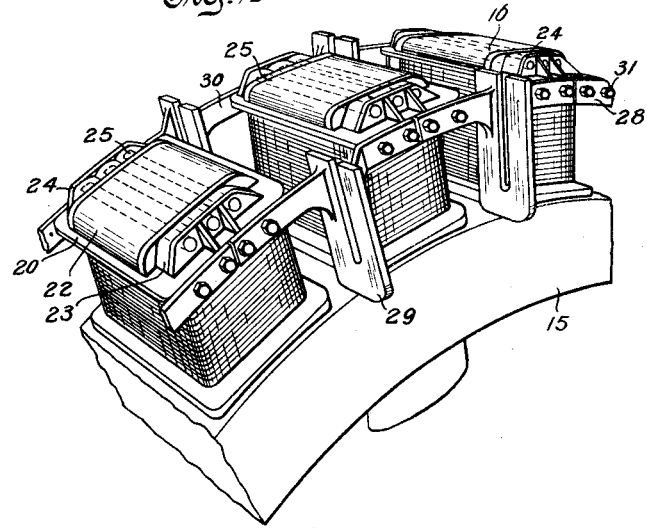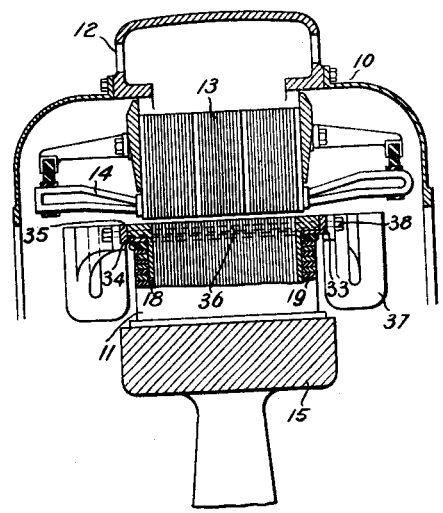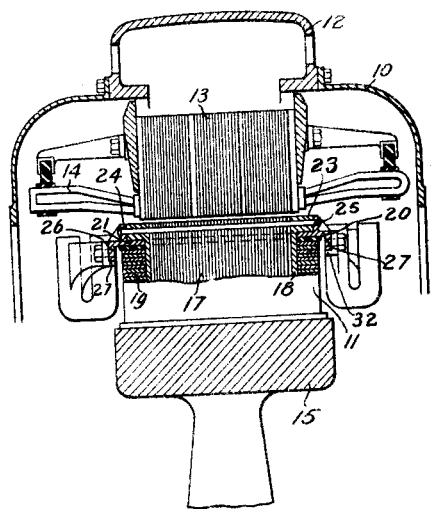

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

1,030,041.   Specification of Letters Patent.   Patented June 18, 1912.

Application filed November 20, 1909. Serial No. 529,008.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.
This invention relates to dynamo-electric machines and particularly to self-starting synchronous motors.

It is a well known fact that a synchronous motor may be rendered self-starting by providing on the rotary member of the motor a secondary circuit in which currents are induced, so that the motor may be started and brought up to synchronous speed as an induction motor. The secondary circuit usually consists of bars extending through the poles of the field magnets and short circuiting rings connected to the ends of the bars and located on opposite sides of the field magnets, the bars and rings being formed of copper or other suitable conducting material. It has also been proposed to utilize as part of the secondary circuit dampers or anti-hunting devices in the form of collars which surround the other ends of the poles and are connected together by the short circuiting rings. These devices, although successful for starting purposes are not very efficient because of the low resistance of the secondary circuit and the heavy currents which are induced therein. Furthermore the secondary circuit, except in those machines wherein parts of the circuit serve as dampers after the machine is in operation, as above stated, is of no utility after the machine has been brought up to synchronous speed.

The object of the present invention is to improve the efficiency and utility of starting devices of the above character for synchronous motors.

In carrying out my invention instead of utilizing the ordinary low resistance short circuiting rings for connecting the conductors which extend transversely across the field magnets and in which the currents are induced when the machine is being brought up to speed as an induction motor, I connect together the conductors on adjacent field magnets by short circuiting members preferably in the form of cast metal sections, each having portions which are connected to the conductors on adjacent field magnets and intermediate portions of a shape such that they not only render the
resistance between the conductors on adjacent field magnets considerably greater than the corresponding portions of ordinary short circuiting rings, but also provide large heat radiating surfaces and serve as fan blades to cool the field magnets and stator when the machine is in operation.

My invention may be further briefly summarized as consisting in certain novel details of construction and combinations and arrangements of parts which will be described in the specification and set forth in the appended claims.

For an understanding of my invention reference is had to the accompanying sheet of drawings wherein—

Figure 1 is a perspective view of a portion of a rotary field member of a synchronous motor equipped with the preferred form of my invention. Fig. 2 is a sectional view taken through a portion of the stator of the motor and through a portion of the rotor, part of a field magnet being shown in elevation and part in section, the section being taken substantially through the center of the field magnet. Fig. 3 is a view similar to Fig. 2 showing a slight modification of my invention.

Referring now to the figures of the drawing, 10 represents a portion of the stator and 11 a portion of the rotor or rotary field member of a synchronous motor, the stator, which may be of the usual construction, comprising a frame 12, a laminated core 13 and a winding 14 supported at the inner periphery of the stator core. The rotor 11 includes a spider having a rim 15 to which are secured a number of field magnets 16 each having a pole 17 built up of laminæ which are clamped between end plates 18, and each pole being surrounded by a coil 19 which, in this case, is formed of edgewise wound strap copper. The parts so far described may be of the usual constructions.

Before specifically describing the features which constitute the present invention, it may be said that I have here shown a secondary circuit for rendering the motor self-starting composed partly of dampers for preventing hunting or fluctuations in the speed of the motor above or below synchronism, the dampers serving as conductors in which currents are induced when the motor is being brought up to speed as well as forming seats of induced currents to prevent hunting in a well known manner. It is immaterial, however, as far as certain features of my invention are concerned whether dampers or other conductors extending transversely of the field magnets are utilized in the secondary circuit.

Mounted on the outer ends of the field poles are collars which in Figs. 1 and 2 are designated by the reference character 20, each collar, as will be seen, being provided with a portion 21 which surrounds the pole and extends between the outer end of the coil 19 and the pole tips 22 on two sides of the field magnet and the coil-retaining flanges 23 which project from the end plates on the other two sides of the field magnet. The collar is also provided on opposite sides of the field magnet, with a pair of flanges 24 which extend radially outward from the collar outside of the flanges 23 of the end plates, and extending transversely through the laminæ and end plates of the pole and secured at their outer ends to these outwardly extending flanges 24 are a number of bars 25 which, together with the collars 20, constitute the dampers or anti-hunting devices of the machine. The theory of operation of these dampers is so well known that further description of the same need not be given.

In the construction shown in Figs. 1 and 2 the collars 20 have portions 26 which extend outwardly or laterally beyond the coils as continuations of the portions 21 which are clamped between the coils and the coil-retaining projections at the outer end of the pole, and at the extremities of these outwardly extending portions 26 are two flanges 27 which extend radially inward for a short distance along the coil on opposite sides of the field magnet.

Instead of connecting together the collars by ordinary short circuiting rings I employ short circuiting sections 28 which are preferably in the form of castings of suitable conducting material and which connect together the collars on adjacent field magnets on both sides of the rotary member. Each of these sections consists preferably of a flat U-shaped portion 29 and of a pair of arms 30 which are integral respectively with the two sides of the U-shaped portion 29 and extend in opposite directions therefrom, the arms 30 being secured by bolts 31 to the inwardly extending flanges 27 of the damping collars on two adjacent field magnets. The arms 30 not only engage the outer faces of the flanges 27, but, as shown clearly in Fig. 2, have portions 32 which extend under these flanges so as to assist in holding the sections in place. The flat U-shaped portions 29 are preferably arranged radially and transversely with respect to the plane of rotation of the field magnet. The dampers together with the short circuiting sections form a closed secondary by means of which the motor can be started as an induction motor and brought up to synchronous speed in a well known manner, currents being induced in the sides of the collars which extend transversely of the field magnets and in the damping bars which extend transversely through the poles. The portions 29 of the short circuiting sections provide considerable resistance between the collars or dampers on adjacent field magnets; they absorb considerable of the heat generated by the currents induced in the secondary; they provide large heat radiating surfaces; and when the machine is in operation act as fan blades to cool the stator 10 and particularly the stator winding 14.

In the construction shown in Fig. 3 the stator 10 and rotor 11 are of the same construction as previously described, the dampers and the manner of securing the short circuiting conductors thereto only being slightly varied. In this case each field magnet is provided with a damping collar 33 having a portion 34 which surrounds the pole and is located as in the first instance, between the coil and the coil-retaining portion of the pole. At opposite sides of the field magnet this collar is provided with flanges 35 which are quite similar to the flanges 24 of the construction first described and extend radially outward from the portion 34 along the flanges of the end plates between which the laminæ of the pole are clamped. Extending through the laminæ and end plates of the pole, as in the first instance, are damping bars or conductors 36 the outer ends of which are secured to these flanges 35. Instead of providing separate flanges to which the short circuiting sections may be connected, the latter which are designated by the reference character 37 and are of substantially the same shape and construction as the sections 28 previously described, are secured by bolts 38 to the outwardly projecting flanges 35 to which the damping bars 36 are secured.

I do not desire to be confined to the exact details shown but aim in my claims to cover all modifications which do not involve a departure from the spirit and scope of my invention.

What I claim as new and desire to secure by Letters Patent is:—

1. In a synchronous dynamo-electric machine, a rotary member having a plurality of field magnets consisting of field poles and coils, a secondary circuit carried by the rotary member for rendering the machine self-starting comprising conductors extending transversely of the plane of rotation, and means for short circuiting said transversely extending conductors comprising sectional conductors connected to the same and having enlarged radially extending resistance portions intermediate the portions connected to said conductors.

2. In a synchronous motor, a rotary member provided with field magnets comprising field poles and field coils, a closed secondary on the rotary member comprising conductors at the ends of the field magnets and extending transversely of the same, and means for short circuiting said conductors comprising short circuiting sections each secured to the conductors on adjacent field magnets and having elongated resistance portions between the field magnets.

3. In a synchronous dynamo-electric machine, a rotary member having a plurality of field magnets consisting of field poles and field coils, a closed secondary carried by said rotary member comprising collars and bars at the outer ends of the field poles, and means for short circuiting said collars and bars comprising metal sections having portions secured to the bars of adjacent field magnets and intermediate elongated resistance portions.

4. In a synchronous dynamo-electric machine, a rotary member having a plurality of field magnets consisting of field poles and coils, a closed secondary carried by said rotary member, said secondary comprising conductors carried by the field magnets and extending transversely thereof, and means for short circuiting said conductors comprising short circuiting sections each having a portion secured to the conductors on adjacent field magnets.

5. In a synchronous dynamo-electric machine, a rotary member having a plurality of field magnets each composed of a coil and pole, and a closed secondary portable on the rotary member and consisting of conductors carried by the field magnets and extending transversely thereof, and means for short circuiting said conductors comprising short circuiting sections each having a radially arranged flat U-shaped portion and arms extending in opposite directions from the sides of said portion and secured to the conductors carried by a pair of adjacent field magnets.

6. In a synchronous dynamo-electric machine, a plurality of field magnets each consisting of a field pole and coil, a closed secondary carried by said rotary member comprising damping collars surrounding the outer ends of the poles, said collars having on opposite sides of the field magnets substantially radially arranged flanges, and means for short circuiting said collars comprising short circuiting sections each consisting of portions secured to the collars on adjacent field magnets and an intermediate resistance portion.

7. In a synchronous dynamo-electric machine, a rotary member having a plurality of field magnets consisting of field poles and coils, dampers carried by said field magnets each comprising a collar surrounding a pole and conductors extending transversely through the pole and secured to opposite sides of the collars, said collars having substantially radially arranged flanges on opposite sides of the field magnets, cast metal short circuiting sections for said collars, each section consisting of a flat substantially U-shaped portion arranged radially with respect to the axis of the rotary member and transversely extending arms integral with the sides of said U-shaped portion and secured to the flanges of the collars on adjacent field magnets.

In testimony whereof I affix my signature in the presence of two witnesses.

ROBERT R. WILLIAMSON.

Witnesses:
  Chas. L. Byrns,
  Geo. E. Stahl.